United States Patent [19]
Graiver et al.

[11] Patent Number: 5,891,548
[45] Date of Patent: Apr. 6, 1999

[54] ENCAPSULATED SILICA NANOPARTICLES

[75] Inventors: Daniel Graiver; Udo C. Pernisz, both of Midland, Mich.

[73] Assignee: Dow Corning Corporation, Midland, Mich.

[21] Appl. No.: 725,044

[22] Filed: Oct. 3, 1996

[51] Int. Cl.$^6$ .............................. B32B 5/00; C08L 83/00
[52] U.S. Cl. ..................... 428/98; 428/407; 428/428; 428/446; 428/450; 204/157.41; 204/157.45; 424/490; 524/588; 524/847; 524/858
[58] Field of Search ..................................... 524/588, 847; 524/858; 204/157.41, 157.45; 424/490; 428/98, 407, 428, 446, 450

[56] References Cited

U.S. PATENT DOCUMENTS

| | | | |
|---|---|---|---|
| 2,504,388 | 4/1950 | Braley | 154/128 |
| 2,676,182 | 4/1954 | Daudt | 260/448 |
| 2,706,190 | 4/1955 | Clark | 260/46 |
| 2,833,742 | 5/1958 | Koch | 260/46 |
| 2,843,555 | 7/1958 | Berridge | 260/18 |
| 2,902,467 | 9/1959 | Chipman | 260/46 |
| 2,934,519 | 4/1960 | Clark | 260/46 |
| 2,999,077 | 9/1961 | Nitzsche | 260/18 |
| 3,079,281 | 2/1963 | Dexter | 117/161 |
| 3,344,104 | 9/1967 | Hyde | 260/32 |
| 4,310,678 | 1/1982 | Blizzard | 556/451 |
| 4,322,518 | 3/1982 | Blozzard | 528/15 |
| 4,562,096 | 12/1985 | Lo | 427/208 |
| 5,158,933 | 10/1992 | Holtz et al. | 305/1 |
| 5,434,878 | 7/1995 | Lawandy | 372/43 |
| 5,525,377 | 6/1996 | Gallagher et al. | 427/512 |
| 5,573,783 | 11/1996 | Desieno et al. | 424/490 |
| 5,580,655 | 12/1996 | El-Shall et al. | 428/402 |
| 5,585,020 | 12/1996 | Becker et al. | 219/121.85 |
| 5,695,617 | 12/1997 | Graiver et al. | 204/157.41 |

OTHER PUBLICATIONS

Journal of Physical Chemistry, vol. 99, No. 51, Dec. 21, 1995, pp. 17805–17809.

Chemistry & Technology of Silicones, Walter Noll, Academic Press, 1968, pp. 386–399.

Journal of Physical Chemistry, vol. 98, No. 12, Mar. 1994, pp. 3067–3070.

Polymeric materials Science & Engineering, vol. 73, 1995, pp. 37–38.

*Primary Examiner*—Randy Gulakowski
*Attorney, Agent, or Firm*—James L. DeCesare

[57] ABSTRACT

A curable silicone is used to encapsulate porous, photoluminescing silica nanoparticles having three-dimensional, web-like structures. The encapsulation protects the silica nanoparticles, preserves their photoluminescent effect, and can be used as a coating. The composition is used to prepare articles of manufacture by casting it on a substrate such as glass or a silicon wafer and curing it. Special effects can be obtained by using a mask on the substrate prior to deposit of nanoparticles and curing the silicone matrix.

19 Claims, 1 Drawing Sheet

ENCAPSULATED SILICA NANOPARTICLES

CROSS-REFERENCE TO RELATED APPLICATIONS

This application is related to a prior U.S. patent application Ser. No. 08/398,268, filed Mar. 3, 1995, entitled "Silica Nanoparticles", and now U.S. Pat. No. 5,580,655 granted Dec. 3, 1996.

BACKGROUND OF THE INVENTION

This invention is directed to the encapsulation of photoluminescent silica nanoparticles in a coating matrix.

In the prior application SN 08/398,268, there is described a novel form of silica having a three-dimensional web-like nanoparticle morphology. The material is prepared as a low density powder which exhibits strong visible photoluminescence when excited with ultraviolet (UV) light.

However, for useful applications of the photoluminescent effect, the powder form of silica nanoparticles is not convenient. To solve this problem, we have shown that these silica nanoparticles can be encapsulated in a curable silicone composition, and that the mixture can then be cast as a coating on a substrate (i.e., glass or a silicon wafer), without loss of the photoluminescent properties of the silica nanoparticle structure. Such coatings are useful in image intensifiers that convert soft X-rays to visible light, or in detectors of UV light rays for beam positioning.

BRIEF SUMMARY OF THE INVENTION

Our invention relates to a composition that is a curable silicone, encapsulating an agglomerated structure of silica nanoparticles without loss of photoluminescent properties. The silica nanoparticles have diameters between about 5 and 50 nanometers (nm), the agglomerated structure has a surface area greater than 300 $m^2/g$ to 460 $m^2/g$ (Brunauer-Emmett-Teller nitrogen adsorption method, i.e., BET method)), and the emission spectrum of its photoluminescence exhibits peaks between about 380 nm to about 540 nm.

Our invention also relates to an article of manufacture which is the above composition cast on a substrate such as glass or a silicon wafer and cured. The glass substrate and silicon wafer can also be masked prior to depositing of nanoparticles and curable silicone.

In addition, the composition can be cast into a mold, cured, and removed.

These and other features and objects of the invention will become apparent from a consideration of the detailed description.

DETAILED DESCRIPTION

Figure 1:
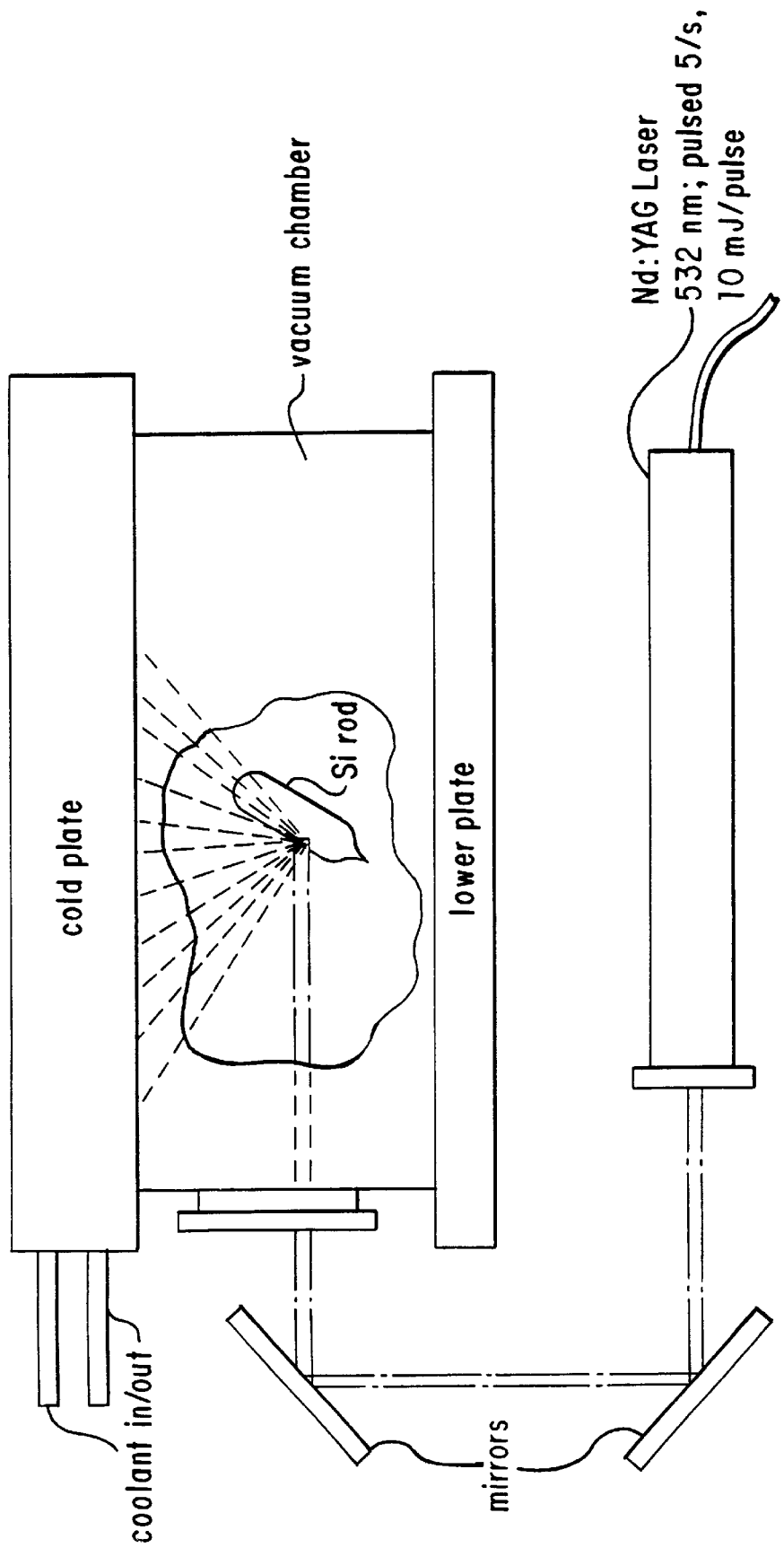
FIG. 1 is a simplified functional representation of an upward thermal diffusion cloud chamber used in the synthesis of the silica nanoparticle structure to be encapsulated.

A curable silicone composition is used to encapsulate silica nanoparticles according to our invention. One example of a suitable silicone composition is a heat-curable liquid silicone composition formed by mixing (A) a substantially linear organopolysiloxane component containing at least two silicon-bonded radicals per molecule which are olefinic hydrocarbon radicals containing 2–8 carbon atoms or hydroxyl radicals; (B) a substantially linear organopolysiloxane component containing at least two silicon-bonded hydrogen atoms per molecule; (C) an amount of a platinum-containing catalyst sufficient to accelerate a reaction between the silicon-bonded olefinic hydrocarbon radicals and/or the hydroxyl radicals, and the silicon-bonded hydrogen atoms, at room temperature; and optionally (D) an amount of a hydrocarbonoxyalkyl maleate sufficient to retard the reaction at room temperature, but insufficient to prevent the reaction at an elevated temperature. Such curable silicone compositions are described in detail in U.S. Pat. No. 4,562,096 (Dec. 31, 1985), which is incorporated herein by reference thereto.

Another example of a curable silicone composition that can be used to encapsulate silica nanoparticles according to our invention, is a heat-curable silicone resin. Most preferred are solvent solutions of hydroxyl-functional organosiloxane resin copolymers consisting essentially of $CH_3SiO_{3/2}$ units, $(CH_3)_2SiO_{2/2}$ units, $C_6H_5SiO_{3/2}$ units, and $(C_6H_5)_2SiO_{2/2}$ units, in a molar ratio of about 25:19:37:19, and having a hydroxyl content of about 0.5 percent by weight to about 3.0 percent by weight.

One specific heat-curable silicone resin that can be used is a 1:1 xylene:toluene solution containing 50 percent by weight solids of a hydroxyl-functional organosiloxane resin copolymer with $CH_3SiO_{3/2}$ units, $(CH_3)_2SiO_{2/2}$ units, $C_6H_5SiO_{3/2}$ units, and $(C_6H_5)_2SiO_{2/2}$ units, in a molar ratio of 25:19:37:19, and having a hydroxyl content of 0.5 percent by weight.

Another specific heat-curable silicone resin that can be used is a toluene solution containing 60 percent by weight solids of a hydroxyl-functional organosiloxane resin copolymer with $CH_3SiO_{3/2}$ units, $(CH_3)_2SiO_{2/2}$ units, $C_6H_5SiO_{3/2}$ units, and $(C_6H_5)_2SiO_{2/2}$ units, in a molar ratio of 25:19:37:19, and having a hydroxyl content of 3.0 percent by weight.

A third specific heat-curable silicone resin that can be used is a xylene solution containing 50 percent by weight solids of a hydroxyl-functional organosiloxane resin copolymer with $CH_3SiO_{3/2}$ units, $(CH_3)_2SiO_{2/2}$ units, $C_6H_5SiO_{3/2}$ units, and $(C_6H_5)_2SiO_{2/2}$ units, in a molar ratio of 25:19:37:19.

Examples of other heat-curable silicone resins that can be used are organosilicon resinous copolymers including $SiO_{4/2}$ units, and one or more $R_3SiO_{1/2}$ units, $R_2SiO_{2/2}$ units, and $RSiO_{3/2}$ units, in a molar ratio such that the number average molecular weight of the resinous copolymer is 1,200–10,000 dalton. R can be an alkyl radical with 1–6 carbon atoms; an aryl radical such as phenyl, tolyl, and xylyl; an alkenyl radical such as vinyl and allyl; or a trifluoropropyl radical.

Following are three (3) specific examples of such resinous copolymers which can be used:

I. An organic solvent soluble (i.e., preferably benzene) resin copolymer of triorganosiloxy units $R_3SiO_{1/2}$ and $SiO_{4/2}$ units in the mole ratio of 0.7 moles of triorganosiloxy units per mole of $SiO_{4/2}$ units. R has the meaning defined above. This resin has a number-average molecular weight of 5,000 dalton based on gel permeation chromatography using silicate resin standards. The triorganosiloxy units are trimethylsiloxy units and dimethylvinylsiloxy units, and the resin includes 1.4–2.2 weight percent silicon bonded vinyl radicals.

II. A resinous copolymeric siloxane prepared by (i) forming an acidic homogenous mixture of a silanol containing resinous copolymeric siloxane with $R_3SiO_{1/2}$ units and $SiO_{4/2}$ units; an organohydrogen polysiloxane with the formula $R_mH_nSiO_{(4-m-n)/2}$ where m and n are positive integers with a sum less than four, preferably 1.9–2.1; and an organic solvent, and (ii) heating the mixture to remove substantially all organic solvent. R has the meaning defined above. R can also be an arylalkyl radical such as betaphenylethyl and betaphenylpropyl; or a cycloaliphatic radical such as cyclopentyl, cyclohexyl, and cyclohexenyl.

III. A siloxane resin copolymer including $R_3SiO_{1/2}$ units and $SiO_{4/2}$ units in a mole ratio such that the number average molecular weight is 1,200 to 10,000 dalton. Preferably, the mole ratio is 0.7:1.0, and the number average molecular weight is 5,000. R is previously defined. The resin contains 2.5 weight percent silicon bonded OH groups. The resin may also contain $R_2SiO_{2/2}$ units and $RSiO_{3/2}$ units.

Such heat-curable silicone resins are described in detail in numerous patents, among which are U.S. Pat. No. 2,504,388 (Apr. 18, 1950); U.S. Pat. No. 2,676,182 (Apr. 20, 1954); U.S. Pat. No. 2,706,190 (Apr. 12, 1955); U.S. Pat. No. 3,079,281 (Feb. 26, 1963); U.S. Pat. No. 4,310,678 (Jan. 12, 1982); and U.S. Pat. No. 4,322,518 (Mar. 30, 1982); which are all incorporated herein by reference.

A further example of a curable silicone composition that can be used to encapsulate silica nanoparticles according to our invention, is a heat-curable silicone rubber. Such compositions typically comprise a silicone gum which is cured, i.e., crosslinked, when heated in the presence of a curing agent. The curing agent can be an organic peroxide such as benzoyl peroxide, 2,4-dichlorobenzoyl peroxide, or dibenzoyl peroxide; sulfur; or various organic compounds such as urea, cyanoguanidine, aldehydes, and ketones, as described for example in U.S. Pat. No. 3,344,104 (Sep. 26, 1967). Generally, the silicone gum is a high molecular weight linear polydiorganosiloxane which is converted from a highly viscous state to a predominately elastic state by the cross-linking. Such heat-curable silicone rubber compositions are well known in the art, and are described in numerous patents including the '104 patent; as well as in the literature as represented by the standard text on silicone chemistry entitled *Chemistry and Technology of Silicones*, Walter Noll, Academic Press, Inc., New York, (1968), Pages 386–395.

An additional example of a curable silicone composition that can be used to encapsulate silica nanoparticles according to our invention, is a room temperature-curable silicone elastomer. Such compositions typically contain a polydiorganosiloxane, a filler, a cross-linker, and a curing catalyst. The composition cures by exposure to moisture, and is viscous with the consistency of toothpaste. It is thixotropic and non-sagging and remains in place until cured.

Silicone elastomers are made by mixing various ingredients in predetermined defined weight and volume ratios. For room temperature vulcanizable silicone elastomers (RTV), the polydiorganosiloxanes are end-blocked with silanol or other appropriate hydrolyzable groups. These polydiorganosiloxanes typically have a kinematic viscosity in excess of 1,000 cSt ($10^{-3}$ $m^2/s$) measured at 25° C., preferably 1,000 to 100,000 cSt (0.1 $m^2/s$).

For purposes of the present invention, useful fillers are small particle silica, i.e., fumed silica, and silicone resins containing monofunctional M units $R_3SiO_{1/2}$ and tetrafunctional Q units $SiO_{4/2}$.

The cross-linking agents are generally silanes or partial hydrolysis products of silanes. These silanes include acetoxysilanes, alkoxysilanes, ketoximosilanes, aminosilanes, and amidosilanes. The cross-linking silanes have three to four hydrolyzable groups per molecule, while the partial hydrolysis products have more than three.

In addition to cross-linking agents, the compositions can include chain-extending agents which are also silanes, but with only two hydrolyzable groups per molecule. The hydrolyzable group terminating the polydiorganosiloxane is often the same as the group of the silane cross-linking agent, but mixtures of different types of hydrolyzable groups can be present in the same mixture.

Catalysts for curing the mixtures are dependent upon the type of cross-linking agent, and include compounds such as metal carboxylates, alkyl orthotitanates, titanate chelates, and zirconium alkoxides and chelates.

Such room temperature-curable silicone elastomeric compositions are well known in the art, and are described in numerous patents, including U.S. Pat. Nos. 2,833,742 (May 6, 1958); 2,843,555 (Jul. 15, 1958); 2,902,467 (Sep. 1, 1959); 2,934,519 (Apr. 26, 1960); and 2,999,077 (Sep. 5, 1961); all of which are referred to in the '104 patent; as well as in the literature, as represented by the standard text on silicone chemistry entitled *Chemistry and Technology of Silicones*, Walter Noll, Academic Press, Inc., New York, (1968), Pages 395–399.

Silica nanoparticles are obtained by laser ablation of an elemental silicon target in an oxygen-containing atmosphere. The morphology consists of agglomerated (i.e. fused together) nanoparticles about 10–20 nm in diameter which are agglomerated in an open three-dimensional network with high surface area.

The silica nanoparticles exhibit blue photoluminescence upon irradiation with ultraviolet light. The nanoparticles have a surface area (BET method) between about 380–460 $m^2/g$, a particle diameter of between about 10–20 nm, and a photoluminescence spectrum exhibiting one peak at about 422 nm (2.94 eV) and another peak at about 467 nm (2.65 eV).

Photoluminescent web-like nanoparticle silica is obtained and synthesized by combining laser vaporization of elemental silicon with controlled condensation from the vapor phase in a modified upward thermal diffusion cloud chamber. A silicon vapor is generated in the chamber by pulsed laser vaporization of an elemental silicon target in the presence of an inert carrier gas and a reactant gas such as oxygen. The silica nanoparticles are deposited on a cold plate in the chamber.

Web-like silica nanoparticles are made according to this method by placing elemental silicon in the lower portion of a chamber and subjecting the silicon to a pulsed laser in the presence of an oxygen-containing inert carrier gas. Silicon vapor is generated in the chamber as a result of the pulsed laser ablation. Silicon atoms and clusters are allowed to react with oxygen present in the chamber to form vapor phase silicon oxide molecules. The vapor phase silicon oxide molecules and clusters are cooled with the carrier gas, and then form silica nanoparticles which condense in the upper portion of the chamber on a cold plate.

The surface area of these nanoparticles depends upon the experimental parameters used in the synthesis. Values between 380–460 $m^2/g$ have been determined by the Brunauer-Emmett-Teller nitrogen adsorption method. This standard technique for determining specific surface area is described in numerous texts, including *Journal of the American Chemical Society*, Volume 60, Page 309, (1938). By comparison, the largest surface area of commercial fumed silica has a value of only 300 $m^2/g$ (BET method) with a nominal particle diameter of 7 nm.

The following example illustrates this method for preparing photoluminescent silica nanoparticles.

EXAMPLE I

Preparation of Silica Nanoparticles

An upward thermal diffusion cloud chamber is used for synthesis of the silica nanoparticles. The principles of operation of the chamber, its design and construction, are described in detail in *The Journal of Chemical Physics*, Volume 52, Number 9, May 1, 1970, Pages 4733–4748.

The standard chamber was modified to accommodate synthesis of silica nanoparticles, and our modified chamber is shown in FIG. 1. As seen in FIG. 1, a vacuum chamber is formed by two horizontal circular stainless steel plates which are separated by a circular glass ring. A silicon rod (Si rod in FIG. 1) is the target, and it is mounted close to the lower plate. The vacuum chamber is filled with inert carrier gas such as pure helium or argon. The inert carrier gas contains a known concentration of oxygen as reactant gas, although other reactant gases can be employed, such as $N_2$ or $NH_3$ for producing nitrides, and $CH_4$ or $C_2H_4$ for producing carbides.

The silicon target and the lower plate are maintained at a temperature higher than the temperature of the cold plate. The cold plate is cooled to less than −80° C. by circulating liquid nitrogen through coolant inlet and outlet lines. A temperature gradient between the cold plate and the lower plate provides a steady convection current which can be enhanced by adding argon and krypton under high pressure conditions (i.e., $1 \times 10^3$ torr). Silicon vapor is generated with a pulsed laser using the second harmonic (532 nm) of a yttrium aluminum garnet-neodymium (Nd:YAG) laser (15–30 mJ/pulse). Mirrors are used to reflect the beam from the Nd:YAG Laser to the targeted silicon rod. The laser vaporization releases more than $10^{14}$ silicon atoms per pulse ($2 \times 10^{-8}$ s). Silicon atoms and clusters react with oxygen and form vapor phase silicon oxide molecules and clusters. The clusters undergo collisions with the inert carrier gas, and this results in cooling by means of collisional energy losses. Under a total pressure of 800 torr, silicon and oxide clusters approach the thermal energy of the ambient gas within several hundred microns of the vaporization target. Unreacted silicon clusters and less volatile silicon oxide clusters are carried by convection to the nucleation zone near the upper cold plate of the vacuum chamber where the silica nanoparticles form. NICHROME® heater wires (i.e., an alloy containing 60% nickel, 24% iron, 16% chromium, and 0.1% carbon), can be wrapped around the glass ring to provide sufficient heat to prevent water condensation on the ring, and to maintain a constant temperature gradient between the cold plate and the lower plate. Particles form in the nucleation zone, and are condensed on the cold plate during laser vaporization at 10 Hz for 2–6 h. The vacuum chamber is then brought to room temperature, and the particles are collected under atmospheric conditions. Typically, no particles are found in the vacuum chamber except on the cold plate. Glass slides and metal wafers are attached to the cold plate, and are used to examine and analyze the morphology of the deposited silica nanoparticles by Scanning Electron Micrograph (SEM), Transmission Electron Micrograph (TEM), Fourier Transform Infrared Spectroscopy (FTIR), Brunauer-Emmett-Teller Nitrogen Adsorption (BET), and Photoluminescent (PL) spectrum analyses.

The nanoparticle silica prepared using this apparatus is three dimensional and web-like in its nanostructure. It has a BET surface area of greater than 300 $m^2/g$, preferably greater than 300 $m^2/g$ to 460 $m^2/g$, most preferably 380–460 $m^2/g$. It has an emission photoluminescence spectrum exhibiting peaks at between about 380 nm to about 540 nm, but preferably about 400 nm to about 470 nm (photon energy between 2.5 eV and 3.1 eV). Its particle diameter is between about 5–50 nm, but preferably about 10–20 nm.

The apparatus shown in FIG. 1, the method of using this apparatus, and the various analyses carried out on the resulting silica nanoparticles, are all described in greater detail in the copending U.S. application Ser. No. 08/398,268.

The following examples illustrate the encapsulation of silica nanoparticles prepared according to Example I.

EXAMPLE II

Dispersion of Photoluminescent (PL) Web-Like Silica in a Phenylmethyl Silicone Resin Silica nanoparticles obtained by laser ablation as described in Example I were dispersed in a heat-curable silicone resin. The resin was in the form of a xylene solution containing 50 percent by weight solids of a hydroxyl-functional organosiloxane resin copolymer with $CH_3SiO_{3/2}$ units, $(CH_3)_2SiO_{2/2}$ units, $C_6H_5SiO_{3/2}$ units, and $(C_6H_5)_2SiO_{2/2}$ units, in a molar ratio of 25:19:37:19. The concentration of dispersed silica nanoparticles in the silicone resin matrix was 0.1 g in 10 ml. Even at low-shear mixing, an excellent dispersion was obtained. No large aggregates of silica nanoparticles could be observed. The dispersion was cast over a silicon wafer, and the cast wafer was placed in a curing oven at 160° C. for about 10 min. Under these conditions, the phenylmethyl silicone resin matrix cured to an optically transparent resin on top of the silicon wafer. The silica nanoparticles were embedded in the silicone resin, and the silica nanoparticles were only barely visible to the naked eye. The embedded silica nanoparticles in the silicone resin showed a strong photoluminescent response, when the filled silicone resin was placed under ultraviolet (UV) light emanating from a pulsed $N_2$ laser at a wavelength of 377 nm.

EXAMPLE III

Entrapping PL Silica Nanoparticles between Silicon Wafer and Phenylmethyl Silicone Resin 0.1 g of silica nanoparticles obtained by laser ablation as described in Example I was spread over a silicon wafer and covered with the resin solution used in Example II. The solution was cured to a resin by placing the wafer in an oven at 160° C. for about 10 min. The silica nanoparticles became entrapped in a layer between the silicon wafer and the phenylmethyl silicone resin. Silica nanoparticles embedded in the silicone resin showed a strong photoluminescent response when the filled silicone resin was placed under a UV light source with a wavelength of 377 nm.

EXAMPLE IV

Examples II and III were repeated using another type of heat-curable silicone composition. The heat-curable silicone composition used in this example contained a copolymer of dimethylsiloxane and methylhexenylsiloxane, a polymethylhydrogen siloxane, a platinum catalyst, and a maleate inhibitor. As noted above, this type of curable silicone composition is described in detail in U.S. Pat. No. 4,562,096. Silica nanoparticles were embedded in this silicone matrix as described in Examples II and III, and maintained their photoluminescent properties when irradiated with UV light with a wavelength of 377 nm.

EXAMPLE V

Design of Complex Shapes and Forms

A mask was prepared in the shape of the letters DCC. The letters were cut into a stencil leaving an exposed surface in the shape of the letters when the stencil was placed on a silicon wafer. The wafer with the attached stencil was mounted in the laser ablation vacuum chamber on the cold plate in FIG. 1 which was maintained at −80° to −120° C. Silica nanoparticles were generated from a silicon rod target and deposited directly on the wafer/mask assembly. Conditions similar to those described in Example I were employed, i.e., total pressure 800 torr (200 torr oxygen and 600 torr argon atmosphere) with a 300 mJ laser. Silica nanoparticles were generated and were allowed to deposit for 2 hours. At the end of this time, the cold plate with the wafer/mask assembly was slowly brought to room temperature, and the mask was removed from the wafer. The wafer was coated with the heat-curable silicone composition used in Example IV, embedding the deposited silica nanoparticles on the surface of the wafer. The copolymer was cured to a hard coating as described in Examples II and III. The areas coated over by the silica nanoparticles on the surface of the wafer showed photoluminescence in the shape of the mask when irradiated by UV light with a wavelength of 377 nm.

EXAMPLE VI

Advantage of Encapsulating PL Silica Nanoparticles

Total quenching of photoluminescence from silica nanoparticles was observed when the silica nanoparticles were dispersed in a polar medium such as acetone. However, no quenching occurred when the silicone resin or the heat-curable copolymer were used as a dispersing medium or encapsulating matrix as described in Examples II–V.

Other variations may be made in compounds, compositions, and methods described herein without departing from the essential features of our invention. The forms of our invention are exemplary only and not limitations on its scope as defined in the claims.

We claim:

1. A composition comprising a curable silicone encapsulating a porous material obtained by laser ablation of elemental silicon in an oxygen-containing atmosphere having a three-dimensional web structure of agglomerated silica nanoparticles of diameters between about 5–50 nm, a BET surface area greater than 300 $m^2$/g to 460 $m^2$/g, and an emission photoluminescence spectrum exhibiting peaks between about 380 nm to about 540 nm.

2. A composition according to claim 1 in which the curable silicone encapsulating the porous material is a heat-curable silicone formed by mixing (A) a substantially linear organopolysiloxane component containing at least two silicon-bonded radicals per molecule which are olefinic hydrocarbon radicals containing 2–8 carbon atoms or hydroxyl radicals; (B) a substantially linear organopolysiloxane component containing at least two silicon-bonded hydrogen atoms per molecule; and (C) an amount of a platinum-containing catalyst sufficient to accelerate a reaction between the silicon-bonded olefinic hydrocarbon radicals and/or the hydroxyl radicals, and the silicon-bonded hydrogen atoms, at room temperature.

3. A composition according to claim 1 in which the curable silicone encapsulating the porous material is a heat-curable silicone resin.

4. A composition according to claim 3 in which the heat-curable silicone resin is a hydroxyl-functional organosiloxane resin copolymer consisting essentially of $CH_3SiO_{3/2}$ units, $(CH_3)_2SiO_{2/2}$ units, $C_6H_5SiO_{3/2}$ units, and $(C_6H_5)_2SiO_{2/2}$ units, in a molar ratio of about 25:19:37:19, and having a hydroxyl content of about 0.5 percent by weight to about 3.0 percent by weight.

5. An article of manufacture comprising the composition of claim 1 cast on a glass substrate or on a silicon wafer and cured.

6. An article of manufacture according to claim 1 wherein the silica nanoparticles are preferentially deposited on areas designated by a mask on a glass substrate or silicon wafer, the substrate or wafer is coated with the curable silicone, and the coating is cured.

7. An article of manufacture in which the composition of claim 1 is cast into a mold, cured, and removed.

8. A composition comprising a heat-curable silicone encapsulating a porous material obtained by laser ablation of elemental silicon in an oxygen-containing atmosphere in a three-dimensional web structure of agglomerated silica nanoparticles of a diameter of between about 10–20 nanometers, a BET surface area greater than 380 $m^2$/g to 460 $m^2$/g, and an emission photoluminescence spectrum exhibiting peaks at between about 420 nm to about 470 nm.

9. A composition according to claim 8 in which the heat-curable silicone encapsulating the porous material is a silicone formed by mixing (A) a substantially linear organopolysiloxane component containing at least two silicon-bonded radicals per molecule which are olefinic hydrocarbon radicals containing 2–8 carbon atoms or hydroxyl radicals; (B) a substantially linear organopolysiloxane component containing at least two silicon-bonded hydrogen atoms per molecule; and (C) an amount of a platinum-containing catalyst sufficient to accelerate a reaction between the silicon-bonded olefinic hydrocarbon radicals and/or the hydroxyl radicals, and the silicon-bonded hydrogen atoms, at room temperature.

10. A composition according to claim 8 in which the heat-curable silicone encapsulating the porous material is a silicone resin.

11. A composition according to claim 10 in which the silicone resin is a hydroxyl-functional organosiloxane resin copolymer consisting essentially of $CH_3SiO_{3/2}$ units, $(CH_3)_2SiO_{2/2}$ units, $C_6H_5SiO_{3/2}$ units, and $(C_6H_5)_2SiO_{2/2}$ units, in a molar ratio of about 25:19:37:19, and having a hydroxyl content of about 0.5 percent by weight to about 3.0 percent by weight.

12. An article of manufacture comprising the composition of claim 8 cast on a glass substrate or on a silicon wafer and cured.

13. An article of manufacture according to claim 8 wherein the silica nanoparticles are preferentially deposited on areas designated by a mask on a glass substrate or silicon wafer, the substrate or wafer is coated with the heat-curable silicone, and the coating is cured.

14. An article of manufacture in which the composition of claim 8 is cast into a mold, cured, and removed.

15. A curable silicone encapsulating a three-dimensional web structure of agglomerated silica nanoparticles, the silica nanoparticles having diameters between about 5–50 nm, a BET surface area greater than 300 $m^2$/g to 460 $m^2$/g, and an emission photoluminescence spectrum exhibiting peaks between about 380 nm to about 540 nm.

16. Encapsulated silica nanoparticles according to claim 15 in which the curable silicone is selected from the group consisting of heat-curable liquid silicones, heat-curable silicone resins, heat-curable silicone rubbers, and room temperature-curable silicone elastomers.

17. An article of manufacture comprising the encapsulated silica nanoparticles of claim 15 cast on a glass substrate or on a silicon wafer and cured.

18. An article of manufacture according to claim 15 wherein the silica nanoparticles are preferentially deposited on areas designated by a mask on a glass substrate or silicon wafer, the substrate or wafer is coated with the curable silicone, and the coating is cured.

19. An article of manufacture in which the encapsulated silica nanoparticles of claim 15 are cast into a mold, cured, and removed.

* * * * *